(12) United States Patent
Moein (10) Patent No.: US 11,790,086 B2
(45) Date of Patent: Oct. 17, 2023

(54) SELECTIVELY APPLYING DYNAMIC MALWARE ANALYSIS TO SOFTWARE FILES BASED ON COMPRESSION TYPE IN A SOFTWARE SECURITY SYSTEM

(71) Applicant: Fortinet, Inc., Sunnyvale, CA (US)

(72) Inventor: Samer Moein, Burnaby (CA)

(73) Assignee: Fortinet, Inc., Sunnyvale, CA (US)

( * ) Notice: Subject to any disclaimer, the term of this patent is extended or adjusted under 35 U.S.C. 154(b) by 124 days.

(21) Appl. No.: 17/490,076

(22) Filed: Sep. 30, 2021

(65) Prior Publication Data

US 2023/0123564 A1  Apr. 20, 2023

(51) Int. Cl.
*G06F 21/56* (2013.01)

(52) U.S. Cl.
CPC ............ *G06F 21/566* (2013.01); *G06F 21/565* (2013.01); *G06F 2221/033* (2013.01)

(58) Field of Classification Search
CPC ....... G06F 21/56; G06F 21/566; G06F 21/565; G06F 2221/033
See application file for complete search history.

(56) References Cited

U.S. PATENT DOCUMENTS

| | | | | |
|---|---|---|---|---|
| 2017/0054745 A1* | 2/2017 | Zhang et al. | ...... | H04L 63/1425 |
| 2017/0169224 A1* | 6/2017 | Park et al. | ............ | G06F 21/566 |
| 2019/0005226 A1* | 1/2019 | Boutnaru | ............. | G06F 21/554 |
| 2022/0261481 A1* | 8/2022 | Fitzgerald | ........... | G06F 21/566 |

FOREIGN PATENT DOCUMENTS

KR  102335475 B1 * 12/2021

* cited by examiner

*Primary Examiner* — Jayesh M Jhaveri
(74) *Attorney, Agent, or Firm* — LAW OFFICE OF DORIAN CARTWRIGHT; Dorian Cartwright (57) ABSTRACT

A file is received from external to the gateway device and, prior to runtime, the received file is detected as being compressed. Also before runtime, a compression type of the received file is differentiated as packed, protected, and/or archived. Identification of a specific packer, a specific protector or a specific archiver corresponding to the compression type is attempted. Responsive to successful identification, the received file is decompressed and a static type of malware analysis is selected for the received file. Responsive to unsuccessful identification, decompress the received file is attempted with a general unpacker, a general unprotector or a general unarchiver, and responsive to successful decompression, the static type of malware analysis is selected for the received file. Responsive to unsuccessful decompression, a dynamic type of malware analysis on the received file is selected.

9 Claims, 9 Drawing Sheets

SELECTIVELY APPLYING DYNAMIC MALWARE ANALYSIS TO SOFTWARE FILES BASED ON COMPRESSION TYPE IN A SOFTWARE SECURITY SYSTEM

FIELD OF THE INVENTION

The invention relates generally to computer software security, and more specifically, for selectively applying dynamic analysis based on compression protection of data files.

BACKGROUND

Static analysis is a speedy and effective way to identify malicious samples. However, malware authors have developed techniques in which malicious software is compressed to hinder the effort to detect malware using static analysis. Also, archive tools can compress and pack more than one file as one archived file. So, malware authors can use the archiver option to combine more than one file that needed to be together to perform a particular malicious task instead of sending them separately.

As a result, dynamic analysis is often performed to identify malicious samples. Problematically, dynamic analysis is a long and effort consuming process and requires a skilled analyst to succeed.

Therefore, what is needed is a robust technique for selectively applying dynamic analysis based on compression protection of data files.

SUMMARY

These shortcomings are addressed by the present disclosure of methods, computer program products, and systems for managing network connectivity for selectively applying dynamic analysis based on compression protection of data files.

In one embodiment, a file is received from external to the gateway device and, prior to runtime, the received file is detected as being compressed. Also before runtime, a compression type of the received file is differentiated as one or more of packed, protected, or archived.

In another embodiment, identification of a specific packer, a specific protector or a specific archiver corresponding to the compression type is attempted. Responsive to successful identification, the received file is decompressed and a static type of malware analysis is selected for the received file. Responsive to unsuccessful identification, decompression of the received file is attempted with a general unpacker, a general unprotector or a general unarchiver, and responsive to successful decompression, the static type of malware analysis is selected for the received file. Responsive to unsuccessful decompression, a dynamic type of malware analysis on the received file is selected.

In yet another embodiment, security actions are performed on the received file based on the selected type of malware analysis. In one case, a malware analysis selection is fed to a security action module to use as one or more factors.

Advantageously, dynamic malware analysis is efficiently applied using static malware analysis based on compression type.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for selectively applying dynamic analysis based on compression protection of data files. A dynamic malware analysis or a static malware analysis of a received file attempts to give zero-day protection from malicious software. One of ordinary skill in the art will recognize many additional variations made possible by the succinct description of techniques below.

I. Methods for Selection of Malware Analysis Type (FIGS. 1-4)

Figure 1:
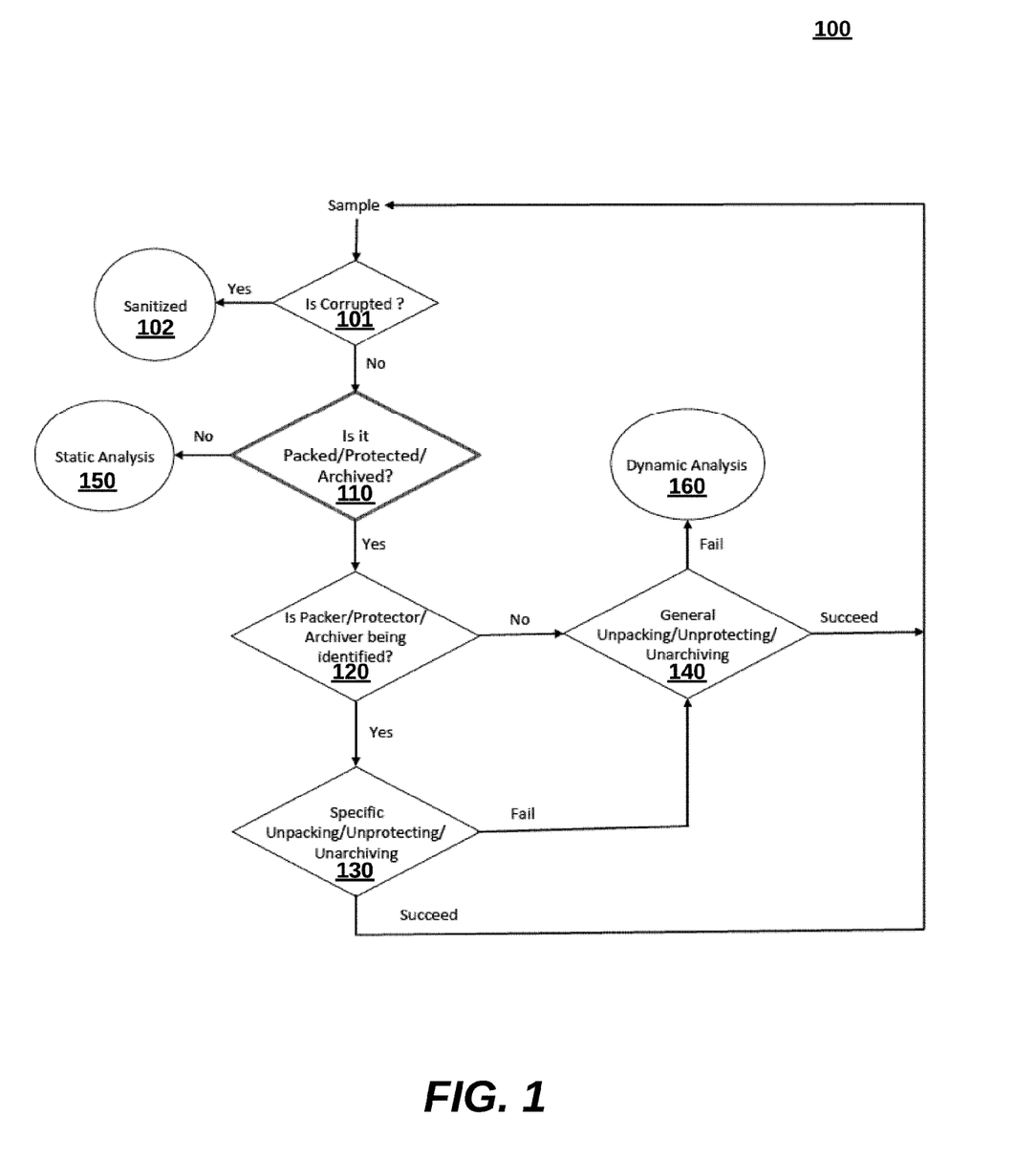
FIG. 1 is a high-level illustration of a system for managing network connectivity for selectively applying dynamic analysis based on compression protection of data files, according to an embodiment.

FIG. 1 is a high-level flow diagram illustrating a method 100 for selectively applying dynamic analysis based on compression protected data files, according to one embodiment. Preferably, static analysis is applied, with relatively lower resource usage. The method 100 can be implemented, for example, by the computer-based system 300 disclosed below in FIG. 3. The steps are merely representative groupings of functionality, as there can be more or fewer steps, and the steps can be performed in different orders. Many other variations of the method 100 are possible.

In one embodiment, a file is received, prior to runtime, checked to see if it is compressed (step 110). The file can be newly downloaded by Wi-Fi, transferred through USB, or loaded from a hard drive to RAM for execution for the first time. For compressed files, a type of compression is identified to differentiate whether a type of compression is, for example, packed, protected, or archived (step 120). In two-layer compression, combinations of compression types are identified. Other compression types and layer configurations are possible within the spirit of this disclosure. An example of the compression identification step 110 is discussed below in association with FIGS. 2A-2D.

Next, the success in decompressing the file drives a selection of which type of malware analysis will be applied to the file. Preferably, static analysis is performed for efficiency, but dynamic analysis is performed when decompression fails. To do so, a specific packer, a specific protector or a specific archiver is identified corresponding to the compression type (step 130). Responsive to successful identification, the received file is decompressed and select a static type of malware analysis can be performed on the received file.

In another case, responsive to unsuccessful identification, file decompression is tested with a general unpacker, a general unprotector or a general unarchiver (step 140). Responsive to successful decompression, the static type of malware analysis is selected for the received file (step 150).

In still another case, responsive to unsuccessful decompression, a dynamic type of malware analysis is selected for the received file (step 160). Examples of dynamic type of malware analysis include, without limitation, emulation, virtualization and sandboxing.

There are a variety of security actions that can be performed based on the selected type of malware analysis. First, the recommendations can be directly applied by a security action module. Second, the recommendations can be taken in combination with other factors for a final selection of analysis type. Further, additional security actions can be taken after analysis based on compression type of the method 100. In some cases, a received file can be identified as corrupted (step 101) and sanitized (step 10) after decompression, before compression analysis.

Figure 2A:
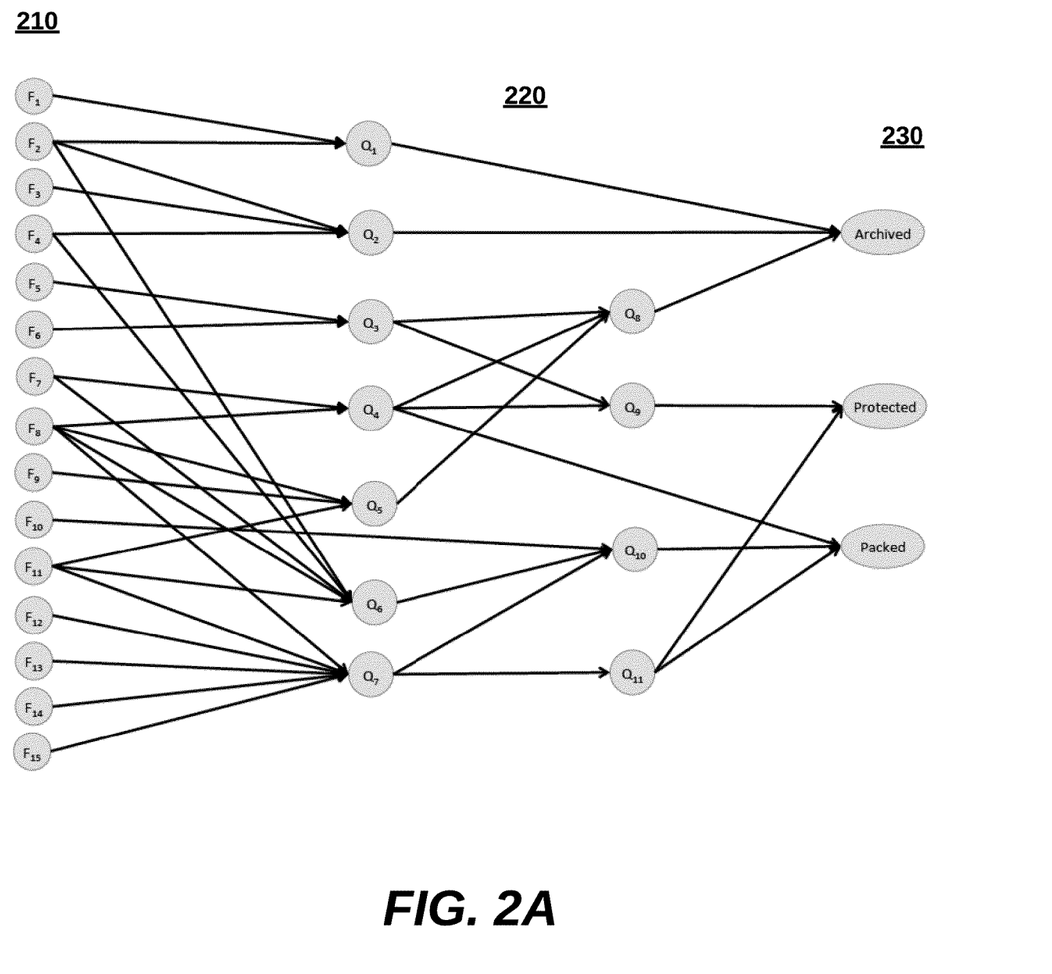
FIG. 2A is a state diagram illustrating a template for branching from characteristics of received files to identification of one or more compression types, more detailed illustration of a network device of the system of FIG. 1, according to an embodiment.
Figure 2B:
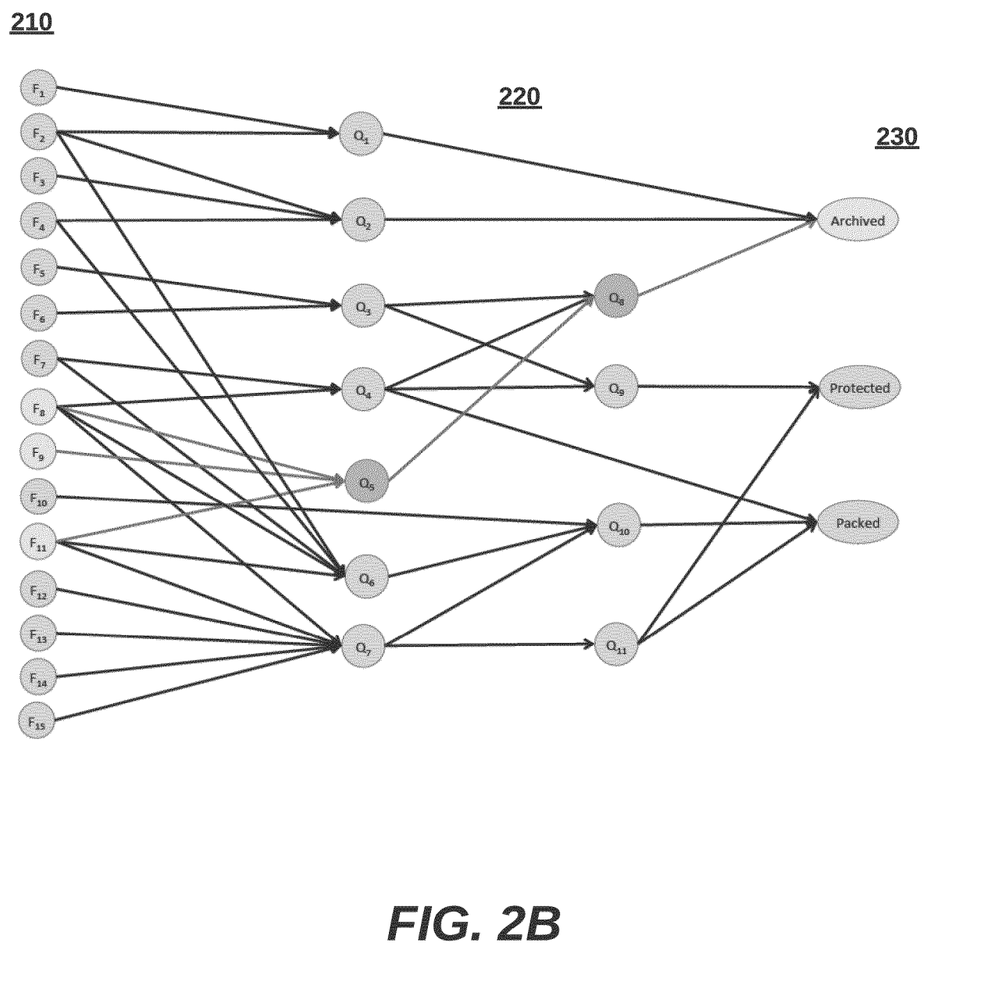
FIGS. 2B-2D are illustrated examples of received files applied to the template in FIG. 2A.
Figure 2C:
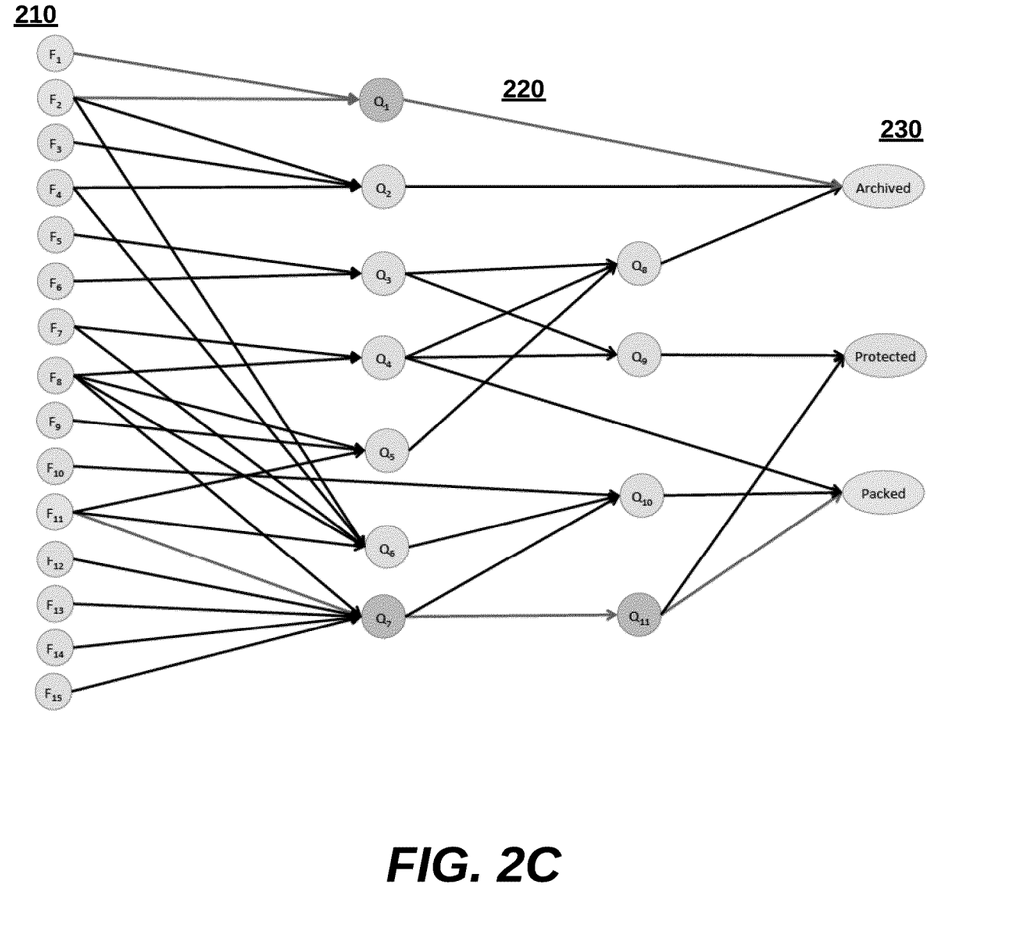
Figure 2D:
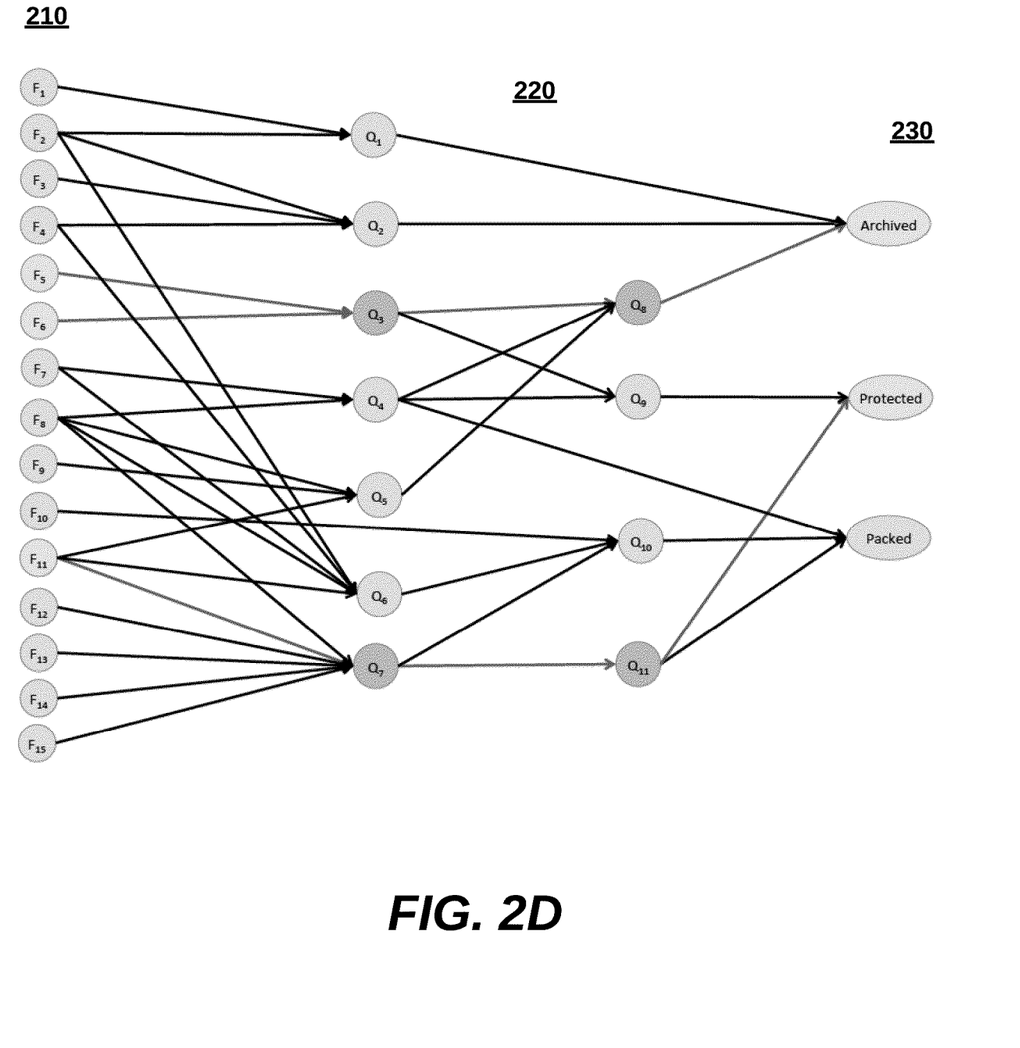

In FIGS. 2A-2D, examples of how to identify one-layer and two-layer compression types are illustrated in a state diagram. A compression state diagram 200 in FIG. 2A outlines logic that connects 15 characteristics 210 of the compressed file, to scoring algorithms 220, ending up at a state identification of archived, protected or packed 230. Thus, FIG. 2A is a template for actual selections, as shown in the examples of FIGS. 2B, 2C and 2D. In, FIG. 2B a packed type of compression is identified. Two-layer compression examples are shown in FIG. 2C, a packed and archived file, and FIG. 2D, an archived and protected file.

In more detail, the archived determination in FIG. 2B starts with characteristics 210 being positively identified for characteristics F8, F9 and F11. Each of F8, F9 and F11 branch to the same scoring algorithm Q5. In this example, the condition is satisfied and thus branched to algorithm Q8. The conditions of algorithm Q8 are true, leading in the state identification 230 at archived. Specific characteristics (F) 210 and specific scoring algorithms (Q) 230 are listed below. Many different implementations will vary how many F and Q are defined, and the branches and algorithm formulas.

One set of characteristics (F) 210 includes the following features which when selected detect archived, packed, and protected files:

F1: Comparable Overlay Size

Some archive tools used an overlay to archive files. This technique leads to a significant overlay in size compared to total file size. If an archive tool is used to archive one uncompressed file, this leads to a comparable overlay size. Considering the compressed version of a file and the original file's size used to archive, we consider 30% is a reliable identifier for an overlay containing another file.

F2: Calculated File Size (CFS)

CFS is the size of loadable information, which includes the header and sections. Calculating this value considers all applicable file structures that may occur, including completely/partially overlapping header/sections and sections/sections and all gaps. This feature is used to calculate the overlay percentage.

F3: Minimum Overlay Size

During analysis and testing, we estimated that the minimum compressed file is around 4 KB. Based on this assumption, if a file has an overlay greater than 4 KB and less than 30% of total file size, it may have an archived file or combination of other things like an installer, flash, or other data.

F4: Big Header

The file header contains the metadata; it is fixed with several required fields. Normal header size with standard file alignment will not exceed 400 Byte. However, several fields can be used to extend the header size to become a little bigger but still in acceptable ranges (i.e., NOS, compiler, and linker information). However, their other parameters can be used to change a header's size to some extreme values. These are three parameters used by attackers and tools to modify the header size to accommodate another file. These parameters are, for example:

a. e_lfanew: This field located at offset 0×3C from the beginning of a PE file contains offset to the NT Header. This field has a fixed location, but it may have different contents. It may contain an offset of several pages far, which can accommodate another file between the location and the offset.

b. Size Of Optional Header (SOOH): This field is mainly used to determine SH's distance. Besides, it can be used to estimate the size of the data directory. The optional header required a maximum of 0×E and 0×F bytes for PE32 and PE64, respectively. These sizes needed to contains all the necessary fields for an optional header. This field's size is just one word, so expanding the optional header's size can be used to accommodate a very tiny file, or encryption key, or some information.

c. Size Of Headers (SOH): SOH field contains the size of an MS-DOS stub, PE header, and section headers rounded up to a multiple of File Alignment. This field mostly needed to modify with modification of any of the above fields. It can be used alone to expand the header size to accommodate another file after the section header without changing the above parameters.

F5: Two Big Section Sizes

The technique used here is similar as F7, but the only difference is archiving tool may archives file(s) in a section other than the most significant section. This technique leads to having two large sections compared to the remaining sections.

F6: DotNet File

This feature is to mark a sample if it DotNet sample or not. This feature helps distinguish if a sample is protected or archived within a section since Dot Net protector tools are intended to have a similar structure as archived techniques.

F7: Big Section Size

Many archiving tools use one section of the archive file(s). In this case, one of the file sections becomes very large compared to other sections. Different tools are using different sections based on algorithms and required permission to run the archived file. If one of a significant section contains another full file, it leads to a massive section size.

F8: Number of Sections (NoS)

The number of sections will not be used as an identifier. It will still compare existing features F9 and F11-F14. Our algorithm also needs to calculate the Number OF Empty Sections (ZNOS) because our algorithm is relying on NON-empty sections value.

F9: Entry Point (EP) Location

The section that contains the entry point of a file is an essential factor because, in all cases, it will be located at the starting of the unpacking/unarchiving/unprotecting stub. However, it is possible to rely on its position since it is not fixed for a similar group. Our proposed solution uses this feature to identify archiving techniques that use an additional section at the end of a file with appropriate permission to archive files.

F10: Has Two Sections

Several techniques relying on generating packing a file into only two sections with large sections contains packed information, and a tiny section contains the unpacking stub. Other features like F7 may cover this technique, F11, or F12 or a combination of them.

F11: Existing of EW Section(s) With Any Other Combinations

A native file does not need a section with EW permission because it separates each type of information differently and gives it the appropriate permission. On the other hand, this type of section permission is required with the most packing tool because it needs to unpack the data and write it to another section. Then, jump to that section after finishing the unpacking process then start executing it.

Eq. (1) shows that F11 is a file that contains at least one EW section and one E with any combinations of other sections permissions.

$$F11 = EW + E + \text{Other Section Permissions, if exists} \quad (1)$$

F12: Existing of E Section(s) and Absence of EW and W Section(s)

This feature covers a file with more than one executable section, and all remaining sections have standard permission. The native file usually has one executable section, so having more than one executable section is suspicious. However, a few file types typically require more than one executable section (i.e., drivers, certificates, native DLLs). It is a good indicator of the EXE file. Still, another indicator should be used in conjunction with a better decision. Eq. (2) shows that F12 is a file that contains one or more E section(s) and one or more R sections, and there is no other permissions exist.

$$F12 = E + R \quad (2)$$

F13: Existing of W Section(s) and Absence of E and EW Section(s)

Some section permissions have some power over others. For example, a writable section can be executed if it contains a code. Therefore, some tools use this feature to generate a packed/protected file that combines only Writable (W) only or Writable and Readable (R) sections only. Eq. (3) shows that F13 is a file that contains one or more W section(s) and zero or more R sections, and there is no other permissions exist.

$$F13 = W + R \quad (3)$$

F14: Existing of EW Section(s) and Absence of E Section(s)

This feature is different from F11 in that both features have EW section(s), but the remaining sections in F11 may have E section, but in F14 have not E sections. Eq. (4) shows that F14 is a file that contains one or more EW, W, and R sections, and there is no E section permission exists.

$$F14 = EW + W + R \quad (4)$$

If any of the features F11 - F14 are triggered, It will flag as true and calculate how many sections belong each permission to use it in the subsequent calculation as shown in Section 6.2.

F15: Driver File

This feature is a flag to identify if a file is a Driver File. The driver file structure may overlap with certain combination features used to detect the packed file, which detect it as a packed file.

The file characteristics activate if true. There can be one, two, or more branches that activate for evaluation in a scoring algorithm at the end of each branch. Based on activated characteristics, one embodiment of an algorithm tests the connected paths to check which route(s) will be activated until reaching a qualified detection(s), using Eq. (5) - (15).

One set of scoring algorithms (Q) 230 includes:

$$Q_1 = \begin{cases} \text{Archived} & \text{if } (F_1/F_2) \geq 0.3 \\ \text{None} & \text{if } (F_1/F_2) < 0.3 \end{cases} \quad (5)$$

$$Q_2 = \begin{cases} \text{Archived} & \text{if } \left(((F_3 \geq 4KB) \wedge (F_3 \leq 0.3 * F_2)) \vee F_4\right) \\ \text{None} & \text{Anything Else} \end{cases} \quad (6)$$

$$Q_3 = \begin{cases} P_{3 \to 8} & \text{if } (F_5 \wedge \neg F_6) \\ P_{3 \to 9} & \text{if } (F_5 \wedge F_6) \\ \text{None} & \text{Anything Else} \end{cases} \quad (7)$$

$$Q_4 = \begin{cases} P_{4 \to 8} & \text{if } ((F_7 \geq 0.91 * (F_2 - F_4)) \wedge (F_8 \geq 3)) \\ P_{4 \to 9} & \text{if } ((F_7 \geq 0.91 * (F_2 - F_4)) \wedge (F_8 \geq 3)) \\ \text{Packed} & \text{if } ((F_7 \geq 0.91 * (F_2 - F_4)) \wedge (F_8 < 3)) \\ \text{None} & \text{Anything Else} \end{cases} \quad (8)$$

$$Q_5 = \begin{cases} P_{5 \to 8} & \text{if } \left(([F_9]_n \equiv [F_8]) \wedge ([F_9]_P \equiv F_{11}) \wedge (F_{11} \geq 1)\right) \\ \text{None} & \text{Anything Else} \end{cases} \quad (9)$$

$$Q_6 = \begin{cases} P_{6 \to 10} & \text{if } \left((F_7 \geq 0.85 * (F_2 - F_4)) \wedge (F_8 \equiv 2) \wedge (F_{11} = 0)\right) \\ \text{None} & \text{Anything Else} \end{cases} \quad (10)$$

$$Q_7 = \begin{cases} P_{7 \to 10} & \text{if } \left((F_{13} > 0) \wedge (F_{11} + F_{12} + F_{14} \equiv 0) \wedge (F_8 \equiv 2)\right) \\ P_{7 \to 11} & \text{if } \left((F_{11} \vee F_{12} \vee F_{13} \vee F_{14}) \wedge (F_8 \neq 2)\right) \\ \text{None} & \text{Anything Else} \end{cases} \quad (11)$$

$$Q_8 = \begin{cases} \text{Archived} & \text{if } (P_{3 \to 8} \vee P_{4 \to 8} \vee P_{5 \to 8}) \\ \text{None} & \text{Anything Else} \end{cases} \quad (12)$$

$$Q_9 = \begin{cases} \text{Protected} & \text{if } (P_{3 \to 9} \vee P_{4 \to 9}) \\ \text{None} & \text{Anything Else} \end{cases} \quad (13)$$

$$Q_{10} = \begin{cases} \text{Packed} & \text{if } (P_{6 \to 10} \wedge P_{7 \to 10} \wedge F_{10}) \\ \text{None} & \text{Anything Else} \end{cases} \quad (14)$$

$$Q_{11} = \quad (15)$$
$$\begin{cases} \text{Packed} & \text{if } \left((\mathcal{ER} \equiv F_8) \wedge (2 \leq F_8 \leq 4)\right) \\ \text{Packed} & \text{if } \left((\mathcal{EWE} \geq \lceil F_8/2 \rceil) \wedge (\mathcal{EWE} < F_8) \wedge (\mathcal{W} \equiv 0)\right) \\ \text{Packed} & \text{if } \left(((\mathcal{WEW} \equiv \lceil F_8/2 \rceil + 1) \wedge (F_8 \leq 4)) \vee (\mathcal{EW} \equiv F_8)\right) \\ \text{Protected} & \text{if } \left((\mathcal{W} \equiv F_8) \wedge (F_8 > 4)\right) \\ \text{Protected} & \text{if } \left(((\mathcal{WEW} \geq \lceil F_8/2 \rceil) \vee (\mathcal{WEW} > 4)) \wedge (F_8 > 4) \wedge (\mathcal{E} \equiv 0)\right) \\ \text{Protected} & \text{if } \left(((\mathcal{EWE} > 2) \wedge (\mathcal{E} > \mathcal{EW}) \wedge \neg F_{15}) \vee (\mathcal{EWE} \equiv F_8) \wedge (\mathcal{EW} > \mathcal{E})\right) \\ \text{Protected} & \text{if } \left(((\mathcal{EW'WE} \geq \lceil F_8/2 \rceil) \vee (\mathcal{EW'WE} \geq 4)) \wedge ((\mathcal{W} \neq 0) \vee (\mathcal{E} > 1) \wedge (\mathcal{EW} \equiv 0))\right) \\ \text{None} & \text{Anything Else} \end{cases}$$

There are two mechanisms for scanning files. Decompressed files can be analyzed with a static malware tool, while files that are unable to be decompressed can be analyzed with a dynamic malware tool.

Figure 3:
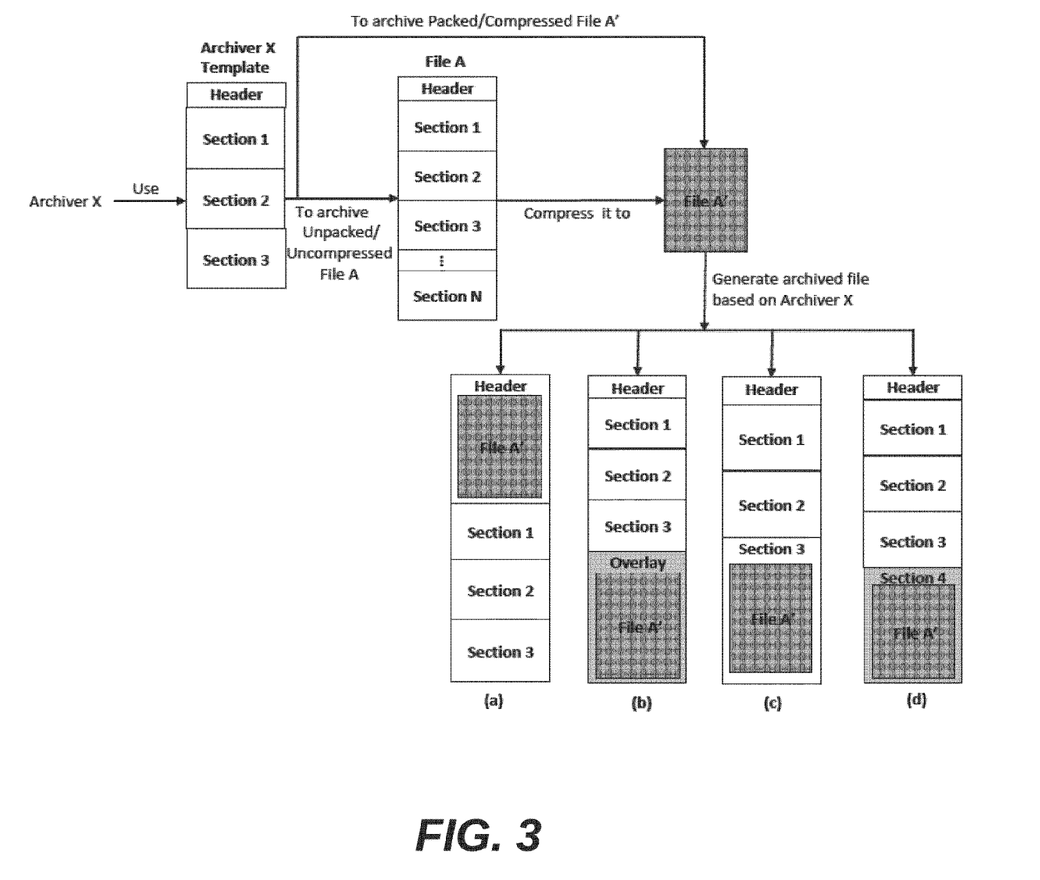
FIG. 3 is a block diagram illustrating format structure of a file when archived, according to an embodiment.

FIG. 3 illustrates an example of the general idea of an archiver algorithm used to archive a file A and shows the different location that archivers techniques generally use. Archivers usually have the option to compress the file(s) before archiving them and have the ability to build executable archivers to start running preselected archived files during the unarchiving process.

In this scenario, the archiver works like a packer with an option that you can pack multiple files comparing to most packing techniques. The packing techniques process starts by compressing the whole or specific part of a file and combine it with an unpacking stub in a template structure. Most packing tools provide packing options and recommend excluding some parts of the file from the packing process. Excluding parts includes the rsrc section, which may raise running error with several windows versions if not exist or are packed. The overlay is another part of a file that most of the packed tool recommends excluding due to performance issues or because it will not load during the loading process.

Figure 4:
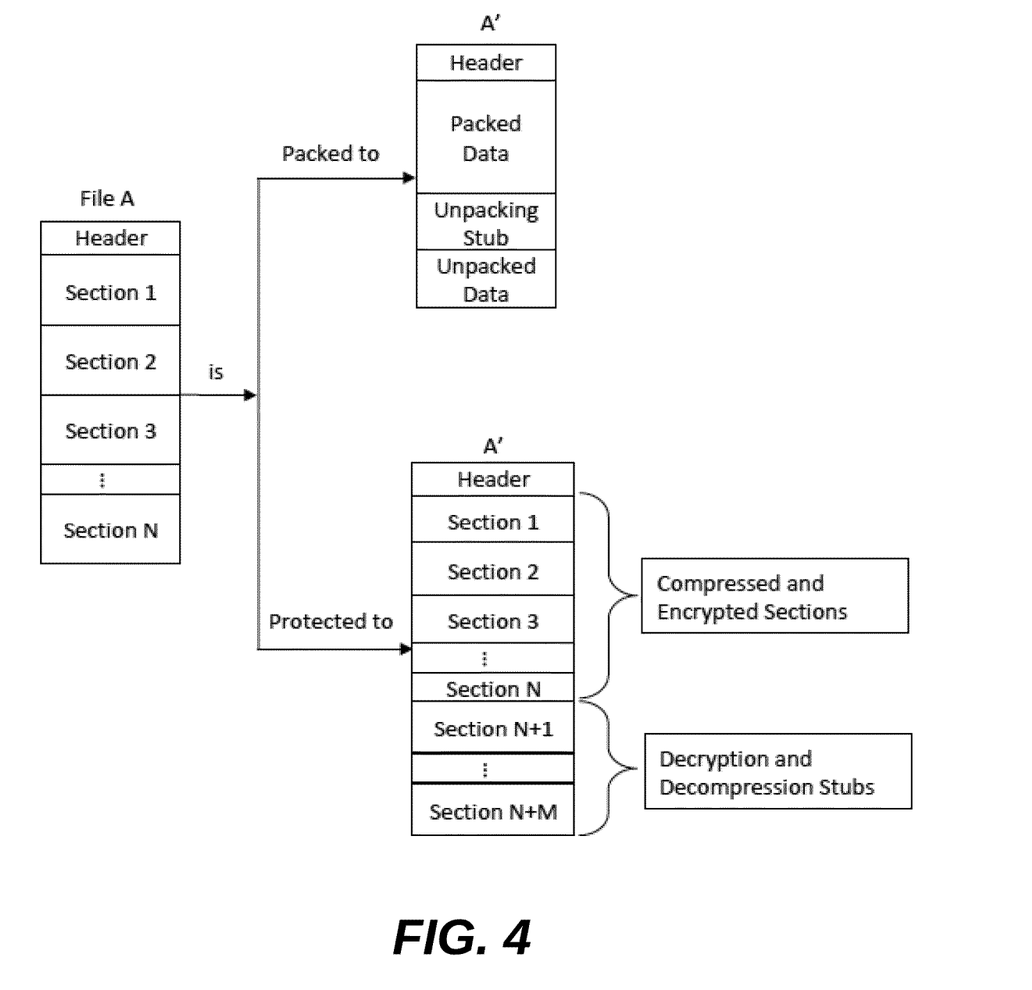
FIG. 4 is a block diagram illustrating a format structure of a file when packed or protected, according to an embodiment.

FIG. 4 shows a packed version of File A. The standard packed version usually has a fixed number of sections regardless of the original file sections. Every tool uses the same section names unless there is an option to define the section name or the user changes it manually.

Protecting techniques vary depending on the protecting purpose and rely on randomization to harden the reverse engineering efforts. FIG. 4 shows the general technique used by many protectors. This technique encrypts the original file section by section and may change their names. Besides, adding one or more section contains the decryption stub besides all data needed for the decryption process.

In general, packing tools generate a file with fewer sections than the original file with a continuous bulk of packed data. The protecting tool generates a file with more sections than the original file with distributing protected data. These processes require changes on a file structure to accommodate the file and support the reversing process to allow the original file to run as expected during runtime.

II. Systems for Selection of Malware Analysis Type (FIGS. 5-6)

Figure 5:
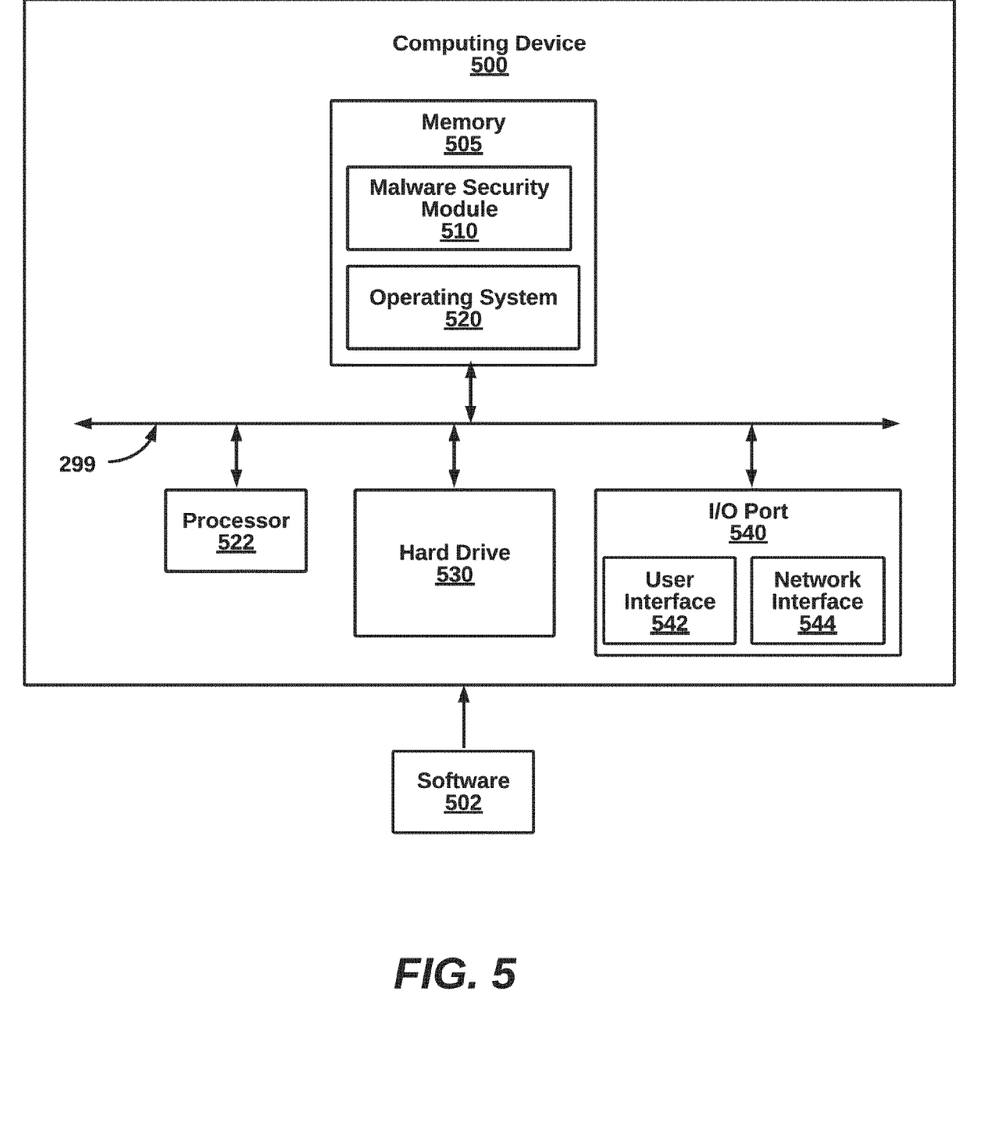
FIG. 5 is a high-level flow diagram illustrating a computing device for managing network connectivity for selectively applying dynamic analysis based on compression protection of data files, according to one preferred embodiment.
Figure 6:
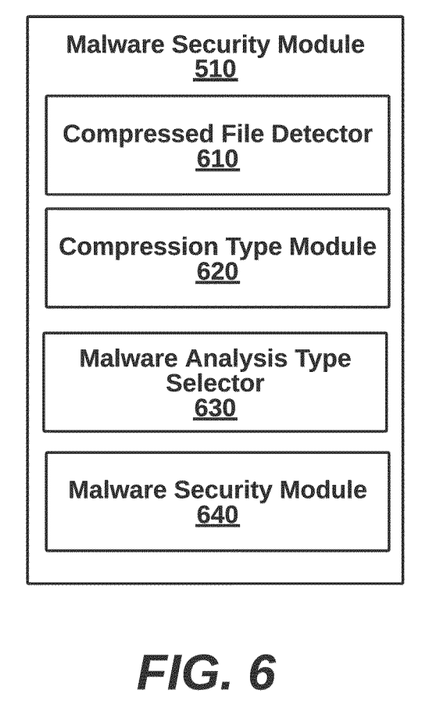
FIG. 6 is a more detailed block diagram illustrating details of the malware security module, according to one embodiment.

FIG. 5 is a high-level illustration of a computing device 500 for selectively applying dynamic analysis based on compression protection of data files, according to an embodiment. The computing device 500 includes a gateway device 510 coupled to a data 599 communication network and an enterprise network 501. Techniques described herein can be implemented at the gateway device 510, at other components within the enterprise network 501, or distributed across cooperating components. The gateway device components can be implemented in hardware, software, or a combination.

The computing device 600, in some embodiments, is coupled in communication to the data communication network 599, preferably, via hard wire. The data communication network 599 can be a data communication network such as the Internet, a WAN, a LAN, WLAN, a cellular network (e.g., 3G, 4G, 5G or 6G), or a hybrid of different types of networks. Various data protocols can dictate format for the data packets. Other components of the enterprise network 501 can be, in turn, coupled downstream or upstream from the computing device 500. For example, access points, Wi-Fi stations, Wi-Fi controllers, and the like, can have access to the same data communication network.

The computing device 600 can be a commercial server blade within a bank of server blades, a mobile computing device, a laptop device, a smartphone, a tablet device, a phablet device, a video game console, a personal computing device, a stationary computing device, an Internet appliance, a virtual computing device, a distributed computing device, a cloud-based computing device, or any appropriate processor-driven device. The computing device 500, of the present embodiment, includes a memory 510, a processor 522, a storage drive 530, and an I/O port 540. Each of the components is coupled for electronic communication via a bus 599. Communication can be digital and/or analog and use any suitable protocol.

In an embodiment, the malware security module 610 selectively performs dynamic malware scanning on detected files that are compressed to protect from malware and other security threats. The malware security module 610 preferably performs static malware scanning to conserve resources, and resorts to dynamic network scanning, as needed under certain circumstances A malware security module 510 can also run in the memory and can interact with the malware security module 510 and the operating system 520. General network applications can run on the computing device 500 including, without limitation, a web browser, a mobile application, an application that uses networking, a remote application executing locally, a network protocol application, a network management application, a network routing application, or the like.

The operating system 520 can be one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation. In other embodiments, the operating system 520 can be specialized for enterprise networks, such as FORTIOS.

The processor 522 can be a network processor (e.g., optimized for IEEE 802.11, IEEE 802.11AC or IEEE 802.11AX), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 520 can be single core, multiple core, or include more than one processing elements. The processor 520 can be disposed on silicon or any other suitable material. The processor 520 can receive and execute instructions and data stored in the memory 510 or the storage drive 530.

The storage drive 530 can be any non-volatile type of storage such as a magnetic disc, EEPROM (electronically erasable programmable read-only memory), Flash, or the like. The storage drive 530 stores code and data for applications.

The I/O port 540 further comprises a user interface 542 and a network interface 544. The user interface 542 can output to a display device and receive input from, for example, a keyboard. The network interface 544 (e.g., an RF antennae) connects to a medium such as Ethernet or Wi-Fi for data input and output.

FIG. 6 is a more detailed block diagram illustrating details of the malware security module 520. The network security module 510 includes a compressed file detector 610, a compression type module 620, a malware analysis type selector 630, and a malware security module 640. The modules can be implemented in source code stored in non-transitory memory executed by a processor. Alternatively, the modules can be implemented in hardware with microcode. The modules can be singular or representative of functionality spread over multiple components.

The compressed file detector 610 receives files detected by an operating system. The files can be downloading from the Internet through a browser, transferred from a thumb drive, or already be resident in memory. In one case, files are detected when headed to a runtime or virtualized environment. A check determines whether the files have been compressed.

The compression type module 620 can differentiate whether a type of compression for the received file is packed, protected, or archived, for one-layer compression. Further, differentiation for two-layer compression can identify packed and protected, packed and archived, and protected and archived. Other layered compression formats are possible.

The malware analysis type selector 630 attempts to identify a specific packer, a specific protector or a specific archiver corresponding to the compression type. In more detail, a vendor software or file format descriptor can provide decoding information to decompress received files according to specific formats, public or proprietary. Responsive to successful identification, the malware analysis type selector 630 decompresses the file and a static type of malware analysis is selected for the received file. On the other hand, responsive to unsuccessful identification, decompression the received file is attempted with a general unpacker, a general unprotector or a general unarchiver. Responsive to successful decompression, the static type of malware analysis is selected for the received file. Finally, responsive to unsuccessful decompression, a dynamic type of malware analysis is selected for the received file. One of ordinary skill in the art will understand that different malware analysis selection algorithms are implementable and within the spirit of the present disclosure.

The malware security module 640 performs a security action based on the selected type of malware analysis. In one case, a selection of static or dynamic malware analysis is implemented directly. In another case, the selection is taken as a recommendation to be weighed with other factors in a high-level software security scheme.

III. Generalities

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTI-GATE family of network security appliances and FORTI-CARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A gateway device for selectively applying dynamic analysis based on compression protection of data files, comprising:
    a processor;
    a network interface communicatively coupled to the processor; and
    a memory, storing:
        a compressed file detector to receive a file from a source external to the gateway device and, prior to runtime, detect that the received file is compressed;
        a compression type module to differentiate whether a type of compression for the received file is packed, protected, or archived;
        a malware analysis type selector to attempt to identify a specific packer, a specific protector or a specific archiver corresponding to the compression type, and
            responsive to a successful identification in said identification attempt, decompressing the received file and selecting a static type of malware analysis on the received file, and
            responsive to an unsuccessful identification in said identification attempt, attempting to decompress the received file with a general unpacker, a general unprotector or a general unarchiver, and
            responsive to a successful decompression in said decompression attempt, select the static type of malware analysis on the received file, and
            responsive to an unsuccessful decompression in said decompression attempt, select a dynamic type of malware analysis on the received file; and
        a malware security module to perform a security action based on the selected type of malware analysis.

2. The computing device of claim 1, wherein the compression type is determined by extracting a plurality of characteristics, and performing an AI analysis on a plurality of extracted characteristics.

3. The gateway device of claim 1, wherein the specific type of compression is identified from PE (portable executable) file structure features, and a specific decompression technique is applied to the received file, and static analysis determines harmfulness of received file, if successful.

4. The computing device of claim 3, wherein the specific decompression technique comprises one or more of: VMProtect, UPX, RAR, and AS protect.

5. The computing device of claim 3, wherein general decompression technique is applied for dynamic analysis if unsuccessful.

6. The computing device of claim 5, wherein the general decompression technique applied for dynamic analysis comprises one or more of emulation, virtualization and sandboxing.

7. The computing device of claim 1, wherein the compression type module identifies at least two types of compression for the received file.

8. A computer-implemented method in a gateway device, at least partially implemented in hardware, for selectively applying dynamic analysis based on compression protection of data files, the method comprising the steps of:
    receiving a file from a source external to the gateway device and, prior to runtime, detecting that the received file is compressed;
    differentiating whether a type of compression for the received file is packed, protected, or archived;
    attempting to identify a specific packer, a specific protector or a specific archiver corresponding to the compression type, and
        responsive to a successful identification in said identification attempt, decompressing the received file and selecting a static type of malware analysis on the received file, and responsive to an unsuccessful identification in said identification attempt, attempting to decompress the received file with a general unpacker, a general unprotector or a general unarchiver, and responsive to a successful decompression in said decompression attempt, selecting the static type of malware analysis on the received file, and responsive to an unsuccessful decompression in said decompression attempt, selecting a dynamic type of malware analysis on the received file; and performing a security action based on the selected type of malware analysis.

9. A non-transitory computer-readable media in a gateway device, when executed by a processor, for selectively applying dynamic analysis based on compression protection of data files, the method comprising the steps of:

receiving, at a data input port of the gateway device, a file from a source external to the gateway device and, prior to runtime, detecting that the received file is compressed;

differentiating, with a processor of the gateway device, whether a type of compression for the received file is packed, protected, or archived;

attempting to identify a specific packer, a specific protector or a specific archiver corresponding to the compression type, and responsive to a successful identification in said identification attempt, decompressing the received file and selecting a static type of malware analysis on the received file, and responsive to an unsuccessful identification in said identification attempt, attempting to decompress the received file with a general unpacker, a general unprotector or a general unarchiver, and responsive to a successful decompression in said decompression attempt, selecting the static type of malware analysis on the received file, and responsive to an unsuccessful decompression in said decompression attempt, selecting a dynamic type of malware analysis on the received file; and performing a security action based on the selected type of malware analysis.

\* \* \* \* \*